United States Patent
He

(10) Patent No.: US 12,549,802 B2
(45) Date of Patent: Feb. 10, 2026

(54) VIDEO PROCESSING METHOD, APPARATUS, DEVICE AND STORAGE MEDIUM

(71) Applicant: Beijing Zitiao Network Technology Co., Ltd., Beijing (CN)

(72) Inventor: Jiayi He, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/539,258

(22) Filed: Dec. 13, 2023

(65) Prior Publication Data

US 2024/0114198 A1 Apr. 4, 2024

Related U.S. Application Data

(63) Continuation of application No. PCT/CN2023/110498, filed on Aug. 1, 2023.

(30) Foreign Application Priority Data

Aug. 1, 2022 (CN) .................. 202210915150.X

(51) Int. Cl.
*H04N 21/431* (2011.01)

(52) U.S. Cl.
CPC ..... *H04N 21/4318* (2013.01); *H04N 21/4312* (2013.01)

(58) Field of Classification Search
CPC .............................................. H04N 21/20–80
See application file for complete search history.

(56) References Cited

U.S. PATENT DOCUMENTS

| 7,869,699 | B2* | 1/2011 | Mate ............... G11B 27/11 386/280 |
| 9,208,819 | B1* | 12/2015 | Gregg ............... H04N 5/781 |
| 10,743,073 | B1* | 8/2020 | Noel ............... H04N 21/47205 |
| 11,818,407 | B2* | 11/2023 | Fiorentino ......... G11B 27/11 |
| 2003/0002851 | A1* | 1/2003 | Hsiao ............. G11B 27/034 386/280 |

(Continued)

FOREIGN PATENT DOCUMENTS

| CN | 108769562 A | 11/2018 |
| CN | 108769814 A | 11/2018 |

(Continued)

OTHER PUBLICATIONS

International Patent Application No. PCT/CN2023/110498; Int'l Search Report; dated Nov. 8, 2023; 2 pages.

(Continued)

*Primary Examiner* — Mushfikh I Alam
(74) *Attorney, Agent, or Firm* — BakerHostetler

(57) ABSTRACT

The present disclosure provides a video processing method, an apparatus, a device, and a storage medium, and the method includes: first in response to a shooting operation based on a target video editing material, acquiring a shooting video material and presenting a target effect video, in which the target effect video is a video obtained by performing video editing on the shooting video material with the target video editing material; then displaying the shooting video material and the target video editing material in an editing material track of the target effect video.

12 Claims, 6 Drawing Sheets

In response to a shooting operation based on a target video editing material, acquiring a shooting video material and presenting a target effect video; — S101

Displaying the shooting video material and the target video editing material in an editing material track of the target effect video. — S102

(56) References Cited

U.S. PATENT DOCUMENTS

| | | | | |
|---|---|---|---|---|
| 2012/0308209 | A1* | 12/2012 | Zaletel | G11B 27/34 |
| | | | | 386/E5.028 |
| 2013/0011121 | A1* | 1/2013 | Forsyth | G11B 27/034 |
| | | | | 386/245 |
| 2013/0275312 | A1* | 10/2013 | Claman | G06Q 10/103 |
| | | | | 705/301 |
| 2014/0267749 | A1* | 9/2014 | Frigon | H04N 1/00838 |
| | | | | 348/159 |
| 2015/0139615 | A1* | 5/2015 | Hill | H04N 21/2743 |
| | | | | 386/285 |
| 2016/0358631 | A1* | 12/2016 | Lee | G11B 27/105 |
| 2017/0229146 | A1* | 8/2017 | Garak | G06F 3/04845 |
| 2017/0285918 | A1* | 10/2017 | Shah | G06F 3/04845 |
| 2018/0308524 | A1* | 10/2018 | Muyal | G11B 27/34 |
| 2019/0108856 | A1* | 4/2019 | Shore | G11B 27/34 |
| 2020/0382724 | A1* | 12/2020 | Pena | G06F 3/04883 |
| 2022/0122573 | A1* | 4/2022 | Steinwedel | G10H 1/368 |
| 2022/0374139 | A1* | 11/2022 | Wehrman | G11B 27/34 |
| 2023/0107220 | A1* | 4/2023 | He | G11B 27/34 |
| | | | | 386/278 |
| 2023/0137850 | A1 | 5/2023 | Sun et al. | |
| 2023/0188670 | A1* | 6/2023 | Overbeeke | H04N 21/41407 |
| | | | | 386/223 |
| 2023/0215469 | A1* | 7/2023 | Dondeti | H04N 21/440245 |
| | | | | 386/280 |
| 2023/0377606 | A1* | 11/2023 | Balko | G11B 27/309 |
| 2025/0246206 | A1* | 7/2025 | Duerr | G06F 40/40 |

FOREIGN PATENT DOCUMENTS

| | | |
|---|---|---|
| CN | 110198486 A | 9/2019 |
| CN | 110383820 A | 10/2019 |
| CN | 111629247 A | 9/2020 |
| CN | 111757013 A | 10/2020 |
| CN | 112035042 A | 12/2020 |
| CN | 112153288 A | 12/2020 |
| CN | 112291627 A | 1/2021 |
| CN | 112449231 A | 3/2021 |
| CN | 112866796 A | 5/2021 |
| CN | 113473204 A | 10/2021 |
| CN | 113806306 A | 12/2021 |
| CN | 114390215 A | 4/2022 |
| CN | 115297272 A | 11/2022 |
| CN | 115297272 B | 3/2024 |
| JP | 2005-354664 A | 12/2005 |
| JP | 2008-135923 A | 6/2008 |
| JP | 2019-512144 A | 5/2019 |
| KR | 10-2377082 B1 | 3/2022 |

OTHER PUBLICATIONS

European Patent Application No. 23817646.5; Extended Search Report; dated Oct. 15, 2024; 10 pages.

Japan Patent Application No. 2023-577371; Notice of Reasons for Refusal; dated Jan. 21, 2025; 6 pages.

* cited by examiner

VIDEO PROCESSING METHOD, APPARATUS, DEVICE AND STORAGE MEDIUM

CROSS-REFERENCE TO RELATED APPLICATION

This application is a continuation of International Application No. PCT/CN2023/110498 filed on Aug. 1, 2023, which claims the priority to and benefits of Chinese Patent Application No. 202210915150.X, filed on Aug. 1, 2022. All the aforementioned patent applications are hereby incorporated by reference in their entireties.

TECHNICAL FIELD

Embodiments of the present disclosure relates to a video processing method, an apparatus, a device, and a storage medium.

BACKGROUND

With the popularity of multimedia short videos, people are more interested in shooting and editing images or videos. People like to perform various editing operations for the shot videos. How to enrich the functions of video editing so as to improve people's video creation experience is an urgent technical problem that need to be resolved.

SUMMARY

In order to solve the above-mentioned technical problems or at least partially solve the above technical problems, the present disclosure provides a video processing method, an apparatus, a device, and a storage medium, which can display the target video editing material and the shooting video material in the shot target effect video on the corresponding editing material tracks respectively, achieving further editing functions, enriching video processing methods, and thereby improving user experience.

In a first aspect, the present disclosure provides a video processing method, and the method comprises:
  in response to a shooting operation based on a target video editing material, acquiring a shooting video material and presenting a target effect video, in which the target effect video is a video obtained by performing video editing on the shooting video material with the target video editing material;
  displaying the shooting video material and the target video editing material in an editing material track of the target effect video;
  a time region of the shooting video material in the editing material track is determined according to a presentation time of the shooting video material in the target effect video, a time region of the target video editing material in the editing material track is determined according to a presentation time of the target video editing material in the target effect video, and a relative relationship between the shooting video material and the target video editing material in the editing material track is determined according to a relative relationship between the shooting video material and the target video editing material presented in the target effect video.

In an optional embodiment, before displaying the shooting video material and the target video editing material in the editing material track of the target effect video, the method further comprises:
  previewing and playing the target effect video on a preview page;
  correspondingly, displaying the shooting video material and the target video editing material in the editing material track of the target effect video, comprises:
  displaying the shooting video material and the target video editing material in the editing material track of the target effect video in response to a triggering operation of an importing editing control on the preview page.

In an optional embodiment, after displaying the shooting video material and the target video editing material in the editing material track of the target effect video, the method further comprises:
  updating the target effect video in response to an editing operation for the target video editing material and/or the shooting video material.

In an optional embodiment, after displaying the shooting video material and the target video editing material in the editing material track of the target effect video, the method further comprises:
  applying a first video editing material to the target effect video in response to an adding operation for the first video editing material.

In an optional embodiment, the editing material track comprises an effect material track and a video track, and displaying the shooting video material and the target video editing material in the editing material track of the target effect video, comprises:
  acquiring material identification corresponding to the target video editing material in the target effect video;
  displaying a video editing material corresponding to the material identification in the effect material track;
  and displaying the shooting video material in the target effect video on the video track.

In a second aspect, the present disclosure provides a video processing apparatus, and the apparatus comprises:
  a shooting module, configured to, in response to a shooting operation based on a target video editing material, acquire a shooting video material, and present a target effect video, wherein the target effect video is a video obtained by performing video editing on the shooting video material with the target video editing material;
  a display module, configured to display the shooting video material and the target video editing material in an editing material track of the target effect video;
  a time region of the shooting video material in the editing material track is determined according to a presentation time of the shooting video material in the target effect video, a time region of the target video editing material in the editing material track is determined according to a presentation time of the target video editing material in the target effect video, and a relative relationship between the shooting video material and the target video editing material in the editing material track is determined according to a relative relationship between the shooting video material and the target video editing material presented in the target effect video.

In a third aspect, the present disclosure provides a computer-readable storage medium, in which instructions are stored in the computer-readable storage medium, and the instructions, when executed by a terminal device, cause the terminal device to implement any one of the methods mentioned above.

In a fourth aspect, the present disclosure provides a device, comprising a memory, a processor, and a computer program stored on the memory and executable on the processor, and the processor, when executing the computer program, implements any one of the methods mentioned above.

The technical solutions provided by the embodiments of the present disclosure have the following advantages:

the embodiments of the present disclosure provide a video processing method, and the method includes: first in response to a shooting operation based on a target video editing material, acquiring a shooting video material and presenting a target effect video, in which the target effect video is a video obtained by performing video editing on the shooting video material with the target video editing material; then displaying the shooting video material and the target video editing material in an editing material track of the target effect video. The embodiments of the present disclosure can display the target video editing material and the shooting video material in the shot target effect video on corresponding editing material tracks respectively, achieving further editing functions, enriching video processing methods, and thereby improving user experience.

BRIEF DESCRIPTION OF DRAWINGS

The drawings herein are incorporated into and form a part of the specification, illustrate the embodiments consistent with the present disclosure, and are used in conjunction with the specification to explain the principles of the present disclosure.

In order to more clearly illustrate the technical solutions in the embodiments of the present disclosure or in prior art, the drawings to be used in the description of the embodiments or prior art will be briefly described below, and it will be obvious to those ordinarily skilled in the art that other drawings can be obtained on the basis of these drawings without inventive work.

DETAILED DESCRIPTION

In order to understand the above objects, features and advantages of the present disclosure more clearly, the solutions of the present disclosure will be further described below. It should be noted that, in case of no conflict, the features in one embodiment or in different embodiments can be combined.

Many specific details are set forth in the following description to fully understand the present disclosure, but the present disclosure can also be implemented in other ways different from those described here; obviously, the embodiments in the specification are a part but not all of the embodiments of the present disclosure.

In order to enrich the functions of video editing so as to improve people's video creation experience, the embodiments of the present disclosure provide a video processing method, including: first in response to a shooting operation based on a target video editing material, acquiring a shooting video material and presenting a target effect video, in which the target effect video is a video obtained by performing video editing on the shooting video material with the target video editing material; then displaying the shooting video material and the target video editing material in an editing material track of the target effect video. The embodiments of the present disclosure can display the target video editing material and the shooting video material in the shot target effect video on corresponding editing material tracks respectively, achieving further editing functions, enriching video processing methods, and thereby improving user experience.

Figure 1:
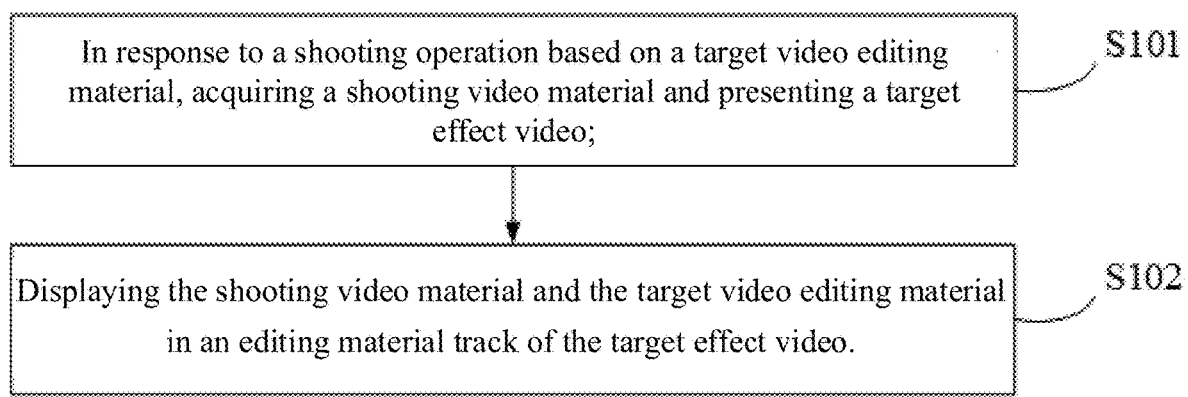
FIG. 1 is a flowchart of a video processing method provided by at least an embodiment of the present disclosure.

Based on this, the embodiments of the present disclosure provide a video processing method. Referring to FIG. 1, which is a flowchart of a video processing method provided by at least an embodiment of the present disclosure, the method includes the follow steps.

S101: in response to a shooting operation based on a target video editing material, acquiring a shooting video material and presenting a target effect video.

For example, the target effect video is a video obtained by performing video editing on the shooting video material with the target video editing material.

In the embodiments of the present disclosure, the target video editing material may include one or more, for example, may include a filter material, a special effect material, a sticker material, an audio material, a text material, etc. The shooting video material may include any type of material captured by the camera, for example, may include people, three-dimensional objects, landmark buildings, environments, etc. For example, the target video editing material can be applied to the shooting video material, and when the target video editing material is used to perform video editing on the shooting video material, the target effect video is obtained.

In the embodiments of the present disclosure, the implementations of the shooting operation based on the target video editing material may include multiple ways. For example, first, one or more target video editing materials are selected, and then a click operation is triggered for a shooting control set on a shooting page, for example, the shooting control may be set at any position on the shooting page, and is generally set at the bottom center of the shooting page.

In the embodiments of the present disclosure, when receiving a shooting operation based on the target video editing material, the shooting video material is acquired, the selected target video editing material is applied to the shooting video material, and the target effect video obtained by performing video editing on the shooting video material with the target video editing material is presented.

For example, taking the case where the target video editing material includes a filter material and a special effect material, and the shooting video material is people as an example, any filter material (such as a filter A) and any special effect material (such as a special effect A) are selected, and when receiving the shooting operation based on the target video editing material, the shooting video material (such as a character a) is acquired, the filter A and the special effect A are applied to the character a, the target effect video is obtained by performing video editing on the character a with the filter A and the special effect A, and the target effect video is presented.

S102: displaying the shooting video material and the target video editing material in an editing material track of the target effect video.

For example, a time region of the shooting video material in the editing material track is determined according to a presentation time of the shooting video material in the target effect video, a time region of the target video editing material in the editing material track is determined according to a presentation time of the target video editing material in the target effect video, and a relative relationship between the shooting video material and the target video editing material in the editing material track is determined according to a relative relationship between the shooting video material and the target video editing material presented in the target effect video.

In the embodiments of the present disclosure, the target effect video presented based on the S101 above further includes an editing material track, for example, the editing material track includes at least one, and may include multiple, and the editing material track is configured to display the shooting video material and the target video editing material. If the target effect video is a video obtained by performing video editing on the shooting video material with a plurality of target video editing materials, the target effect video presented includes one editing material track for displaying the shooting video material, and a plurality of editing material tracks for displaying different target video editing materials. For example, based on the above-mentioned example, the target effect video is obtained by performing video editing on the character a with the filter A and the special effect A, then when the target effect video is presented, three editing material tracks may be included, which are a first editing material track to show the character a, a second editing material track to show the filter A, and a third editing material track to show the special effect A.

In the embodiments of the present disclosure, the plurality of editing material tracks included in the same target effect video are based on the same timeline, and the final time point of the timeline is based on the time region of the editing material track showing the shooting video material.

Figure 2:
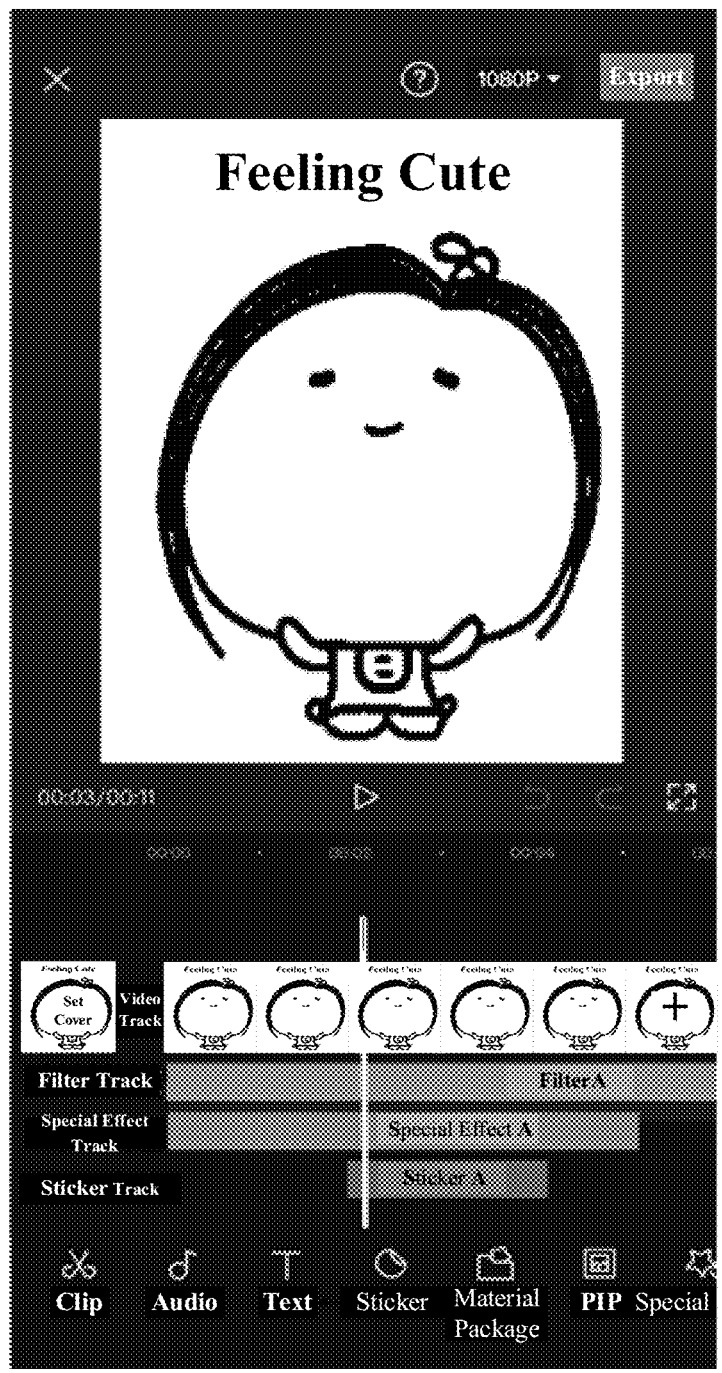
FIG. 2 is a schematic diagram of a video editing page provided by at least an embodiment of the present disclosure.

For example, taking the case where the target effect video is a short video of 11 seconds duration as an example, the target effect video is a short video by performing video editing on the character a with the filter A, the special effect A, and a sticker A. In the editing material track of the target effect video, the method of displaying the shooting video material and the target video editing material can be shown in FIG. 2. FIG. 2 is a schematic diagram of a video editing page provided by at least an embodiment of the present disclosure.

For example, the time region of the shooting video material (such as the character a) in the editing material track is determined according to the presentation time (such as 11 seconds) of the shooting video material (such as the character a) in the target effect video. As shown in FIG. 2, the time region of the character a in the editing material track (such as a video track) is 00:00-00:11. The time region of the target video editing material in the editing material track is determined according to the presentation time of the target video editing material in the target effect video, as shown in FIG. 2, the time region of the filter A in the editing material track (such as a filter track) is 00:00-00:11; the time region of the special effect A in the editing material track (such as a special effect track) is 00:00-00:05; and the time region of the sticker A in the editing material track (such as a sticker track) is 00:02-00:04.

For example, the relative relationship between the shooting video material (such as the character a) and the target video editing material (the special effect A) respectively in the video track and the special effect track is determined according to the relative relationship between the shooting video material (such as the character a) and the target video editing material (the special effect A) presented in the target effect video. Based on the above-mentioned example, the time region of the character a presented in the target effect video is 00:00-00:11, and the time region of the special effect A presented in the target effect video is 00:00-00:05, then, the relative relationship between the character a and the special effect A respectively in the video track and the special effect track is shown in FIG. 2.

In an optional embodiment, the editing material track includes an effect material track and a video track. First, material identification corresponding to the target video editing material in the target effect video is acquired, then a video editing material corresponding to the material identification is displayed in the effect material track, and the shooting video material in the target effect video is displayed on the video track.

In the embodiments of the present disclosure, the editing material track of the target effect video may include an effect material track and a video track, and the video track includes one and is configured to display the shooting video material in the target effect video.

The effect material track may include one or more, and is configured to display the video editing material. For example, if the video editing material is a filter material, the effect material track used to display the filter material may be a filter track; if the video editing material is a special effect material, the effect material track used to display the special effect material may be a special effect track; if the video editing material is a sticker material, the effect material track used to display the sticker material may be a sticker track; if the video editing material is an audio material, the effect material track used to display the audio material may be an audio track; and if the video editing material is a text material, the effect material track used to display the text material may be a text track; and so on.

In the embodiments of the present disclosure, when displaying the shooting video material and the target video editing material in the editing material track of the target effect video, first, the material identification corresponding to the target video editing material in the target effect video is acquired, in which the video editing material and material identifiers have a corresponding relationship, and one video editing material corresponds to one material identification. The implementation of acquiring the material identification corresponding to the target video editing material in the target effect video may include various ways, for example, directly pulling the address of the material identification to acquire the material identification corresponding to the target video editing material.

In the embodiments of the present disclosure, after acquiring the material identification corresponding to each target video editing material in the target effect video, a plurality of different video editing materials are displayed on corresponding effect material tracks, respectively, and the shooting video material in the target effect video is displayed on the video track. For example, the address of material identification 1 is pulled to acquire the material identification 1 corresponding to the target video editing material (such as a filter A), and the address of material identification 2 is pulled to acquire the material identification 2 corresponding to the target video editing material (such as a special effect A), then the filter A may be displayed on the filter track, and the special effect A may be displayed on the special effect track.

In an optional embodiment, before displaying the shooting video material and the target video editing material in the editing material track of the target effect video, the target effect video obtained in the above-mentioned S101 can be previewed and played, and then, the shooting video material and the target video editing material are displayed in the editing material track of the target effect video in response to a triggering operation of an importing editing control on the preview page.

Figure 3:
FIG. 3 is a schematic diagram of a preview page provided by at least an embodiment of the present disclosure.
Figure 3:
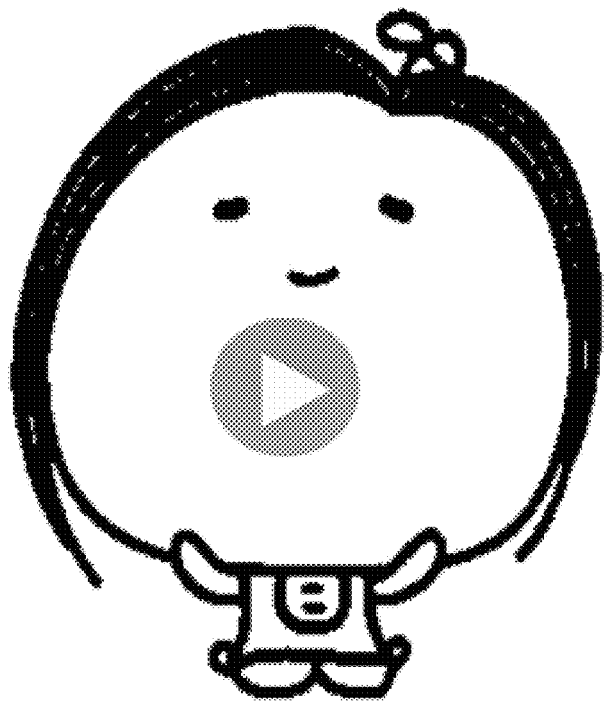
Figure 3:
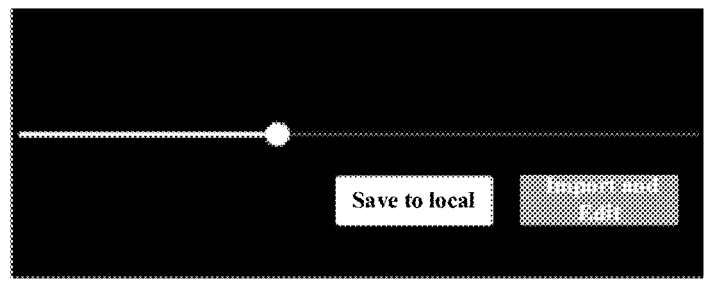

In the embodiments of the present disclosure, the target effect video can be previewed and played on the preview page based on the target effect video obtained in the above-mentioned S101, and during the previewing and playing of the target effect video, there is no editing material track on the preview page, that is, the shooting video material and the target video editing material cannot displayed on the preview page. FIG. 3 is a schematic diagram of a preview page provided by at least an embodiment of the present disclosure. For example, a play progress bar of the target effect video is displayed on the preview page, and clicking anywhere on the target effect video can trigger the previewing and playing of the target effect video.

In the embodiments of the present disclosure, the preview page may further include a save control and an importing editing control. The save control is used to save the target effect video to local storage, and the importing editing control is used to trigger the displaying of the shooting video material and the target video editing material on the editing material track. On the preview page shown in FIG. 3, the save control and importing editing control are set at the lower right corner of the page. It should be noted that the embodiments do not limit the specific positions of the save control and the importing editing control on the preview page.

In the embodiments of the present disclosure, when a triggering operation for the importing editing control on the preview page is received, for example, when a click operation for the importing editing control on the preview page is triggered, it can jump to the video editing page as shown in FIG. 2, and in the editing material track of the target effect video, the shooting video material and the target video editing material are displayed.

In the embodiments of the present disclosure, after receiving the triggering operation for the importing editing control on the preview page and before jumping to the video editing page, the user can be reminded that the video editing page is about to be accessed to inform the user that he or she can perform any edits on the target video editing material. For example, the reminder may include a variety of ways, for example, the first way is to be displayed on the preview page in the form of a pop-up window; the second way is to be displayed on the preview page in the form of a demonstration operation; and so on.

Figure 4:
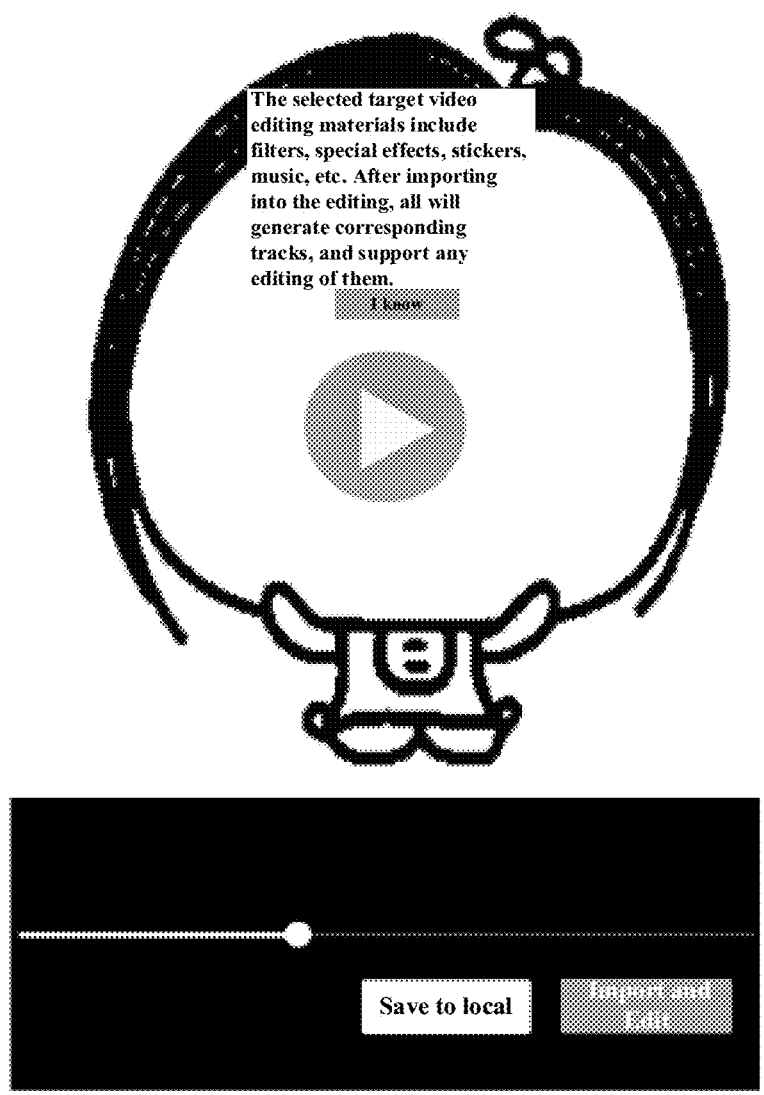
FIG. 4 is a schematic diagram of another preview page provided by at least an embodiment of the present disclosure.

FIG. 4 is a schematic diagram of another preview page provided by at least an embodiment of the present disclosure. For example, a reminder pop-up window pops up on the preview page, the reminder pop-up window includes text, such as "The selected target video editing materials include filters, special effects, stickers, music, etc. After importing into the editing, all will generate corresponding tracks, and support any editing of them." Moreover, when receiving the triggering operation for the "I know" pop-up window, you can close the reminder pop-up window and jump to the video editing page as shown in FIG. 2.

In an optional embodiment, after displaying the shooting video material and the target video editing material in the editing material track of the target effect video, the target effect video is updated in response to an editing operation for the target video editing material and/or the shooting video material.

In the embodiments of the present disclosure, based on the above-mentioned S102, the shooting video material and the target video editing material are displayed in the editing material track of the target effect video, for example, the video editing page shown in FIG. 2 is displayed. Based on the shooting video material and the target video editing material that have been displayed in the editing material track, editing operations may be performed on one or more of the materials. For example, the editing operations may include deletion operations, replacement operations, modification operations, etc., specifically, may include deleting a certain segment of the shooting video material, deleting a certain target video editing material (such as deleting the special effect A), replacing a certain target video editing material (such as replacing the sticker A), modifying the density of a certain target video editing material (such as modifying the density of the filter A), etc.

In the embodiments of the present disclosure, when receiving an editing operation for one or more of the target video editing material and the shooting video material, the target effect video is updated based on the editing operation. For example, based on the above-mentioned examples, when receiving a deletion operation for the filter A, the time region corresponding to the filter A displayed in the filter track of the target effect video is adjusted (for example, delete the time region of the filter A at 00:00-00:04 is deleted) to update the target effect video, that is, the time region of filter A is 00:04-00:11 in the filter track of the updated target effect video.

In an optional embodiment, after displaying the shooting video material and the target video editing material in the editing material track of the target effect video, a first video editing material is applied to the target effect video in response to an adding operation for the first video editing material.

In the embodiments of the present disclosure, based on the above-mentioned S102, the shooting video material and the target video editing material are displayed in the editing material track of the target effect video, for example, the video editing page shown in FIG. 2 is displayed. Based on the editing material track of the target effect video, new video editing materials may also be added and applied to the target effect video to obtain an updated target effect video.

In the embodiments of the present disclosure, when receiving an adding operation for the first video editing material, an editing material track corresponding to the first video editing material is generated and the first video editing material is displayed in the editing material track; in addition, the time region of the first video editing material applied to the target effect video may be adjusted in the editing material track, and the target effect video is updated.

In the video processing method provided by the embodiments of the present disclosure, first, in response to a shooting operation based on a target video editing material, the shooting video material is acquired and the target effect video is presented, in which the target effect video is a video obtained by performing video editing on the shooting video material with the target video editing material; then, the shooting video material and the target video editing material are displayed in an editing material track of the target effect video. The embodiments of the present disclosure can display the target video editing material and the shooting video material in the shot target effect video on corresponding editing material tracks respectively, achieving further editing functions, enriching video processing methods, and thereby improving user experience.

Figure 5:
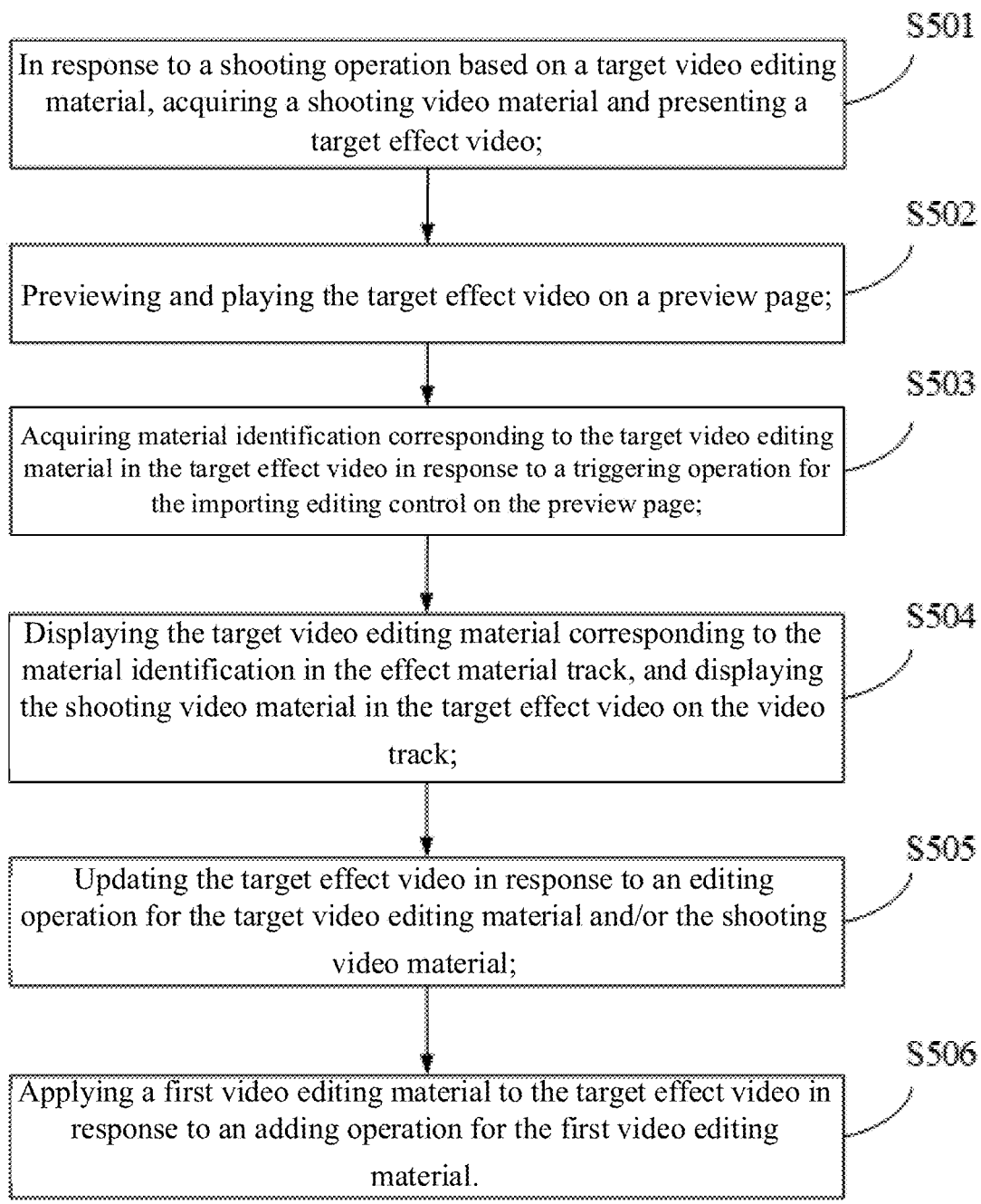
FIG. 5 is a flowchart of another video processing method provided by at least an embodiment of the present disclosure.

Based on the above-mentioned embodiments, the present disclosure further provides a video processing method. FIG. 5 is a flowchart of another video processing method provided by at least an embodiment of the present disclosure, and the method includes the following steps.

S501: in response to a shooting operation based on a target video editing material, acquiring a shooting video material and presenting a target effect video.

For example, the target effect video is a video obtained by performing video editing on the shooting video material with the target video editing material.

In the embodiments of the present disclosure, first, a plurality of target video editing materials are selected, for example, the selected target video editing materials may include a filter B, a special effect B, and a sticker B; when receiving a shooting operation based on the target video editing material, the shooting video material (such as sky b) is acquired, the filter B, the special effect B, and the sticker B are applied to the sky b and a target effect video (such as video 1) is obtained by performing video editing on the sky b with the filter B, the special effect B, and the sticker B, and the video 1 is presented.

S502: previewing and playing the target effect video on a preview page.

In the embodiments of the present disclosure, based on the video 1 obtained in the above-mentioned S501, the video 1 can be previewed and played on the preview page; and referring to the schematic diagram of the preview page shown in FIG. 3, when the video 1 is played on the preview page, a play progress bar of the video 1 as well as the a save control and an importing editing control are displayed.

S503: acquiring material identification corresponding to the target video editing material in the target effect video in response to a triggering operation for the importing editing control on the preview page.

In the embodiments of the present disclosure, when receiving a triggering operation for the importing editing control on the preview page, the address of the material identification is pulled to acquire the material identification (for example, they are material identification 1, material identification 2, and material identification 3, respectively) corresponding to the filter B, the special effect B, and the sticker B in the video 1, respectively.

S504: displaying the target video editing material corresponding to the material identification in the effect material track, and displaying the shooting video material in the target effect video on the video track.

For example, the time region of the shooting video material in the video track is determined according to the presentation time of the shooting video material in the target effect video, the time region of the target video editing material in the effect material track is determined according to the presentation time of the target video editing material in the target effect video, and the relative relationship between the shooting video material and the target video editing material in the editing material track is determined according to the relative relationship between the shooting video material and the target video editing material presented in the target effect video.

In the embodiments of the present disclosure, the editing material track of the target effect video may include an effect material track and a video track, based on the material identification corresponding to the filter B, the special effect B and the sticker B in the video 1 obtained in the above-mentioned S503, respectively, the filter B corresponding to the material identification 1 is displayed in the filter track, the special effect B corresponding to material identification 2 is displayed in the special effect track, the sticker B corresponding to material identification 3 is displayed in the sticker track, and the sky b in the video 1 is displayed in the video track.

In the embodiments of the present disclosure, taking the schematic diagram of the video editing page shown in FIG. 2 as an example, the time region of the sky b in the video track is 00:00-00:11, the time region of the filter B in the filter track is 00:00-00:11, the time region of the special effect B in the special effect track is 00:00-00:05, and the time region of the sticker B in the sticker track is 00:02-00:04.

S505: updating the target effect video in response to an editing operation for the target video editing material and/or the shooting video material.

In the embodiments of the present disclosure, based on the shooting video material and the target video editing material that have been displayed in the editing material track, one or more of the materials may be performed by an editing operation, for example, the special effect B displayed on the special effect track may be deleted, the sticker B displayed on the sticker track may be replaced, and the density of the filter B displayed on the filter track may be modified, etc.

In the embodiments of the present disclosure, when receiving a deletion operation for the special effect B, the time region of the special effect B displayed on the special effect track is adjusted based on the deletion operation (such as the time region of the filter B in a time range of 00:00-00:04 is deleted) to update the video 1. Thus, a video 2 can be obtained, and the time region of the filter B is 00:04-00:11 in the filter track of the video 2.

S506: applying a first video editing material to the target effect video in response to an adding operation for the first video editing material.

In the embodiments of the present disclosure, when receiving an adding operation for the first video editing material (such as a sticker C), a sticker track 2 corresponding to the sticker C is generated and the sticker C is displayed in the sticker track 2, and the sticker C is applied to the video 1 to update the video 1 and obtain a video 3, in which the video 3 not only includes the above-mentioned video track, filter track, special effect track, and sticker track, but also includes the sticker track 2.

It should be noted that the embodiments of the present disclosure do not limit the execution order of the S505 and S506 mentioned above. That is, after the S504 is executed, the editing operation may be performed based on existing target video editing materials, or new video editing materials may be added and applied to the target effect video.

In the video processing method provided by the embodiment of the present disclosure, first, in response to a shooting operation based on a target video editing material, a shooting video material is acquired and a target effect video is presented, in which the target effect video is a video obtained by performing video editing on the shooting video material with the target video editing material; and the target effect video can be previewed and played on a preview page. Then, material identification corresponding to the target video editing material in the target effect video is acquired in response to a triggering operation of an importing editing control on the preview page. Furthermore, the target video editing material corresponding to the material identification is displayed in the effect material track; and the shooting video material in the target effect video is displayed in the video track.

In addition, in each editing material track, after displaying the shooting video material and the target video editing material, the target effect video is updated in response to an editing operation for the target video editing material and/or the shooting video material. The first video editing material may also be applied to the target effect video in response to an adding operation for the first video editing material.

The embodiments of the present disclosure can display the target video editing material and the shooting video material in the shot target effect video on corresponding editing material tracks respectively, achieving further editing functions, enriching video processing methods, and thereby improving user experience.

Figure 6:
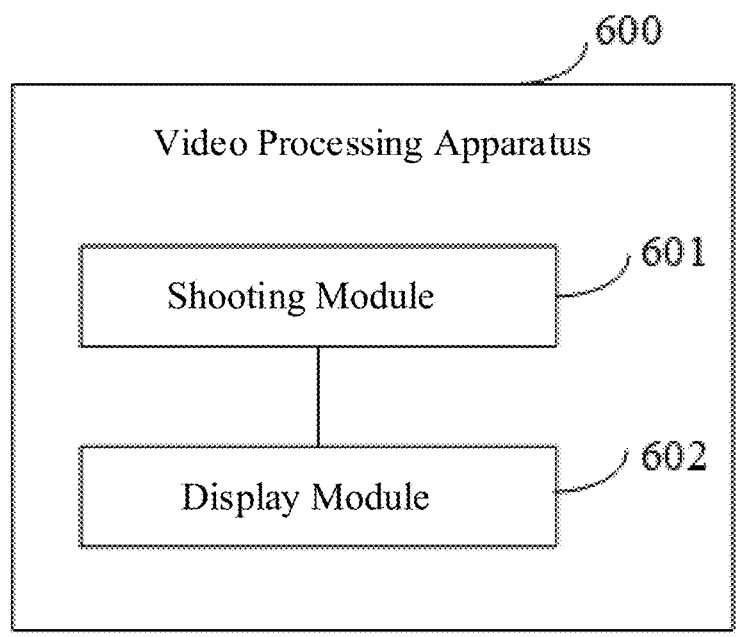
FIG. 6 is a schematic structural diagram of a video processing apparatus provided by at least an embodiment of the present disclosure.

Based on the same inventive concept as the above-mentioned method embodiments, the present disclosure further provides a video processing apparatus. Referring to FIG. 6, which is a schematic structural diagram of a video processing apparatus provided by at least an embodiment of the present disclosure, the video processing apparatus 600 includes a shooting module 601 and a display module 602.

The shooting module 601 is configured to, in response to a shooting operation based on a target video editing material, acquire a shooting video material, and present a target effect video; and the target effect video is a video obtained by performing video editing on the shooting video material with the target video editing material.

The display module 602 is configured to display the shooting video material and the target video editing material in an editing material track of the target effect video.

For example, a time region of the shooting video material in the editing material track is determined according to a presentation time of the shooting video material in the target effect video, a time region of the target video editing material in the editing material track is determined according to a presentation time of the target video editing material in the target effect video, and a relative relationship between the shooting video material and the target video editing material in the editing material track is determined according to a relative relationship between the shooting video material and the target video editing material presented in the target effect video.

In an optional embodiment, the apparatus further includes a preview module.

The preview module is configured to preview and play the target effect video on a preview page.

Correspondingly, the display module 602 includes a first display sub-module.

The first display sub-module is configured to display the shooting video material and the target video editing material in the editing material track of the target effect video in response to a triggering operation of an importing editing control on the preview page.

In an optional embodiment, the apparatus further includes an update module.

The update module is configured to update the target effect video in response to an editing operation for the target video editing material and/or the shooting video material.

In an optional embodiment, the apparatus further includes an application module.

The application module is configured to apply a first video editing material to the target effect video in response to an adding operation for the first video editing material.

In an optional embodiment, the editing material track includes an effect material track and a video track, and the display module 602 includes an acquisition sub-module, a second display sub-module, and a third display sub-module.

The acquisition sub-module is configured to acquire material identification corresponding to the target video editing material in the target effect video.

The second display sub-module is configured to display the video editing material corresponding to the material identification in the effect material track.

The third display sub-module is configured to display the shooting video material in the target effect video on the video track.

In the video processing device provided by the embodiment of the present disclosure, first, in response to a shooting operation based on a target video editing material, the shooting video material is acquired and the target effect video is presented, in which the target effect video is a video obtained by performing video editing on the shooting video material with the target video editing material; then, the shooting video material and the target video editing material are displayed in an editing material track of the target effect video. The embodiments of the present disclosure can display the target video editing material and the shooting video material in the shot target effect video on corresponding editing material tracks respectively, achieving further editing functions, enriching video processing methods, and thereby improving user experience.

In addition to the above-mentioned methods and apparatuses, the embodiments of the present disclosure further provide a computer-readable storage medium, instructions are stored in the computer-readable storage medium, and the instructions, when executed by a terminal device, cause the terminal device to implement the video processing method according to the embodiments of the present disclosure.

The embodiments of the present disclosure further provide a computer program product. The computer program product includes a computer program/instruction, and the computer program/instruction, when executed by a processor, implements the video processing method according to the embodiments of the present disclosure.

Figure 7:
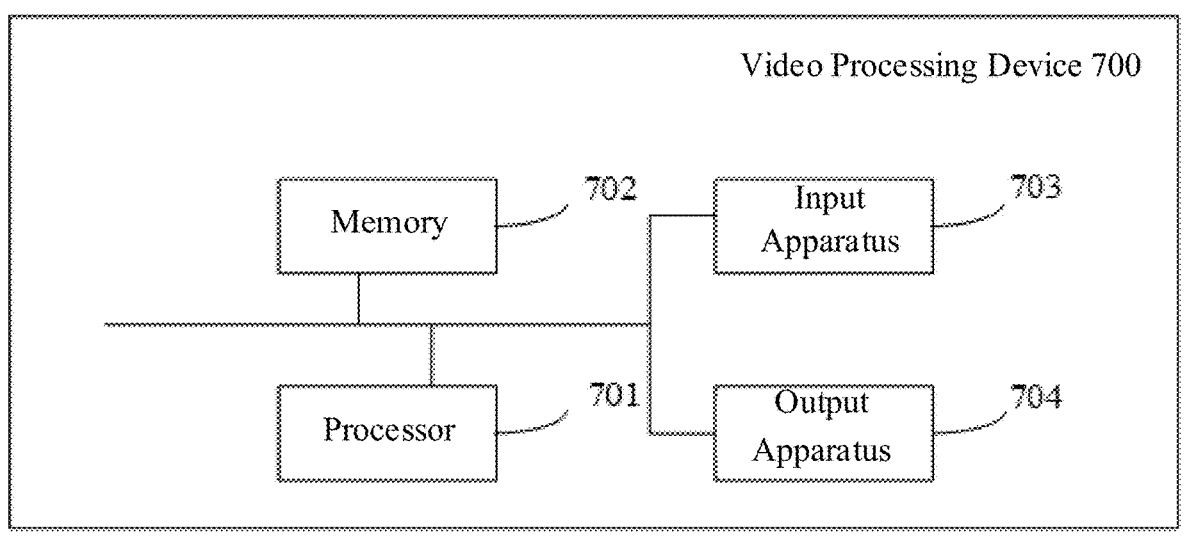
FIG. 7 is a schematic structural diagram of a video processing device provided by at least an embodiment of the present disclosure.

In addition, the embodiments of the present disclosure further provide a video processing device 700, as shown in FIG. 7, which may include a processor 701, a memory 702, an input apparatus 703 and an output apparatus 704.

The number of the processor 701 in the video processing device may be one or more, and one processor is taken as an example in FIG. 7. In some embodiments of the present disclosure, the processor 701, the memory 702, the input apparatus 703 and the output apparatus 704 may be connected through a bus or other means, and the connection through the bus is taken as an example in FIG. 7.

The memory 702 can be configured to store software programs and modules, and the processor 701 executes various functional applications and data processing of the video processing device by running the software programs and modules stored in the memory 702. The memory 702 may mainly include a program storage area and a data storage area, and the program storage area may store an operating system, at least one application program required for a function, and the like. In addition, the memory 702 may include high-speed random-access memory, and may also include non-volatile memory, such as at least one magnetic disk storage device, flash memory device, or other volatile solid-state storage device. The input apparatus 703 may be configured to receive input numeric or character information, and to generate signal input related to user settings and function control of the video processing device.

Specifically, in the present embodiment, the processor 701 can follow the following instructions to load the executable files corresponding to the processes of one or more application programs into the memory 702, and the processor 701 can run the applications stored in the memory 702 to realize the various functions of the above-described video processing device.

It should be noted that in the present disclosure, relational terms such as "first," "second," etc. are only used to distinguish one entity or operation from another entity or operation, and do not necessarily require or imply the existence of any actual relationship or order between these entities or operations. Furthermore, the terms "comprise," "comprising," "include," "including," etc., or any other variant thereof are intended to cover non-exclusive inclusion, such that a process, method, article or device comprising a set of elements includes not only those elements, but also other elements not expressly listed, or other elements not expressly listed for the purpose of such a process, method, article or device, or elements that are inherent to such process, method, article or device. Without further limitation, an element defined by the phrase "includes a . . . " does not preclude the existence of additional identical elements in the process, method, article or device that includes the element.

The above descriptions are only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the present disclosure. Therefore, the present disclosure is not to be limited to the embodiments described herein but is to be accorded the widest scope consistent with the principles and novel features disclosed herein.

The invention claimed is:

1. A video processing method, comprising:
   in response to a shooting operation based on at least one target video editing material, acquiring a shooting video material and presenting a target effect video, wherein the target effect video is a video obtained by performing video editing on the shooting video material with the at least one target video editing material;
   displaying the shooting video material and the at least one target video editing material in corresponding editing tracks on a page of editing the target effect video,
   wherein the editing tracks comprise a video track configured to display the shooting video material, the editing tracks further comprise at least one effect track configured to display the at least one target video editing material,
   wherein the video track is configured to display the shooting video material for editing in a time region corresponding to a presentation time of the shooting video material in the target effect video, the at least one effect track is configured to display the at least one target video editing material for editing in a time region corresponding to a presentation time of the at least one target video editing material in the target effect video, each of at least one effect track corresponds a target video editing material among the at least one target video editing material, and a relative relationship between a length of the video track and a length of the at least one effect track on the page of editing the target effect video indicates a relative relationship between respective durations of the shooting video material and the at least one target video editing material being presented in the target effect video;
   performing at least one editing operation, wherein the at least one editing operation comprises editing the shooting video material by utilizing the video track or editing the target video editing material among the at least one target video editing material by utilizing a corresponding effect track among the at least one effect track; and
   updating the target effect video based on the at least one editing operation performed via the video track or the corresponding effect track.

2. The method according to claim 1, wherein before the displaying the shooting video material and the at least one target video editing material in corresponding editing tracks on a page of editing the target effect video, the method further comprises:
   previewing and playing the target effect video on a preview page;
   correspondingly, the displaying the shooting video material and the at least one target video editing material in corresponding editing tracks on a page of editing the target effect video, comprises:
   displaying the shooting video material and the at least one target video editing material in the corresponding editing tracks on the page of editing the target effect video in response to a triggering operation of an importing editing control on the preview page.

3. The method according to claim 1, wherein after the displaying the shooting video material and the at least one target video editing material in corresponding editing tracks on a page of editing the target effect video, the method further comprises:
   applying a first video editing material to the target effect video in response to an adding operation for the first video editing material.

4. The method according to claim 2, wherein after the displaying the shooting video material and the at least one target video editing material in corresponding editing tracks on a page of editing the target effect video, the method further comprises:
   applying a first video editing material to the target effect video in response to an adding operation for the first video editing material.

5. The method according to claim 1, wherein the displaying the shooting video material and the at least one target video editing material in corresponding editing tracks on a page of editing the target effect video, comprises:
   acquiring material identification corresponding to the at least one target video editing material in the target effect video;
   displaying a video editing material corresponding to the material identification in the editing track corresponding to the at least one target video editing material on the page of editing the target effect video; and
   displaying the shooting video material in the target effect video on the editing track corresponding to the shooting video material on the page of editing the target effect video.

6. The method according to claim 2, wherein the displaying the shooting video material and the at least one target video editing material in corresponding editing tracks on a page of editing the target effect video, comprises:

acquiring material identification corresponding to the at least one target video editing material in the target effect video;

displaying a video editing material corresponding to the material identification in the editing track corresponding to the at least one target video editing material on the page of editing the target effect video; and displaying the shooting video material in the target effect video on the editing track corresponding to the shooting video material on the page of editing the target effect video.

7. The method according to claim 3, wherein the displaying the shooting video material and the at least one target video editing material in corresponding editing tracks on a page of editing the target effect video, comprises:

acquiring material identification corresponding to the at least one target video editing material in the target effect video;

displaying a video editing material corresponding to the material identification in the editing track corresponding to the at least one target video editing material on the page of editing the target effect video; and displaying the shooting video material in the target effect video on the editing track corresponding to the shooting video material on the page of editing the target effect video.

8. A non-transitory computer-readable storage medium, wherein instructions are stored in the computer-readable storage medium, and the instructions, when executed by a terminal device, cause the terminal device to implement operations comprising:

in response to a shooting operation based on at least one target video editing material, acquiring a shooting video material and presenting a target effect video, wherein the target effect video is a video obtained by performing video editing on the shooting video material with the at least one target video editing material;

displaying the shooting video material and the at least one target video editing material in corresponding editing tracks on a page of editing the target effect video, wherein the editing tracks comprise a video track configured to display the shooting video material, the editing tracks further comprise at least one effect track configured to display the at least one target video editing material, wherein the video track is configured to display the shooting video material for editing in a time region corresponding to a presentation time of the shooting video material in the target effect video, the at least one effect track is configured to display the at least one target video editing material for editing in a time region corresponding to a presentation time of the at least one target video editing material in the target effect video, each of at least one effect track corresponds a target video editing material among the at least one target video editing material, and a relative relationship between a length of the video track and a length of the at least one effect track on the page of editing the target effect video indicates a relative relationship between respective durations of the shooting video material and the at least one target video editing material being presented in the target effect video;

performing at least one editing operation, wherein the at least one editing operation comprises editing the shooting video material by utilizing the video track or editing the target video editing material among the at least one target video editing material by utilizing a corresponding effect track among the at least one effect track; and updating the target effect video based on the at least one editing operation performed via the video track or the corresponding effect track.

9. A device, comprising:

a memory, a processor, and a computer program stored on the memory and executable on the processor, wherein the processor, when executing the computer program, implements operations comprising:

in response to a shooting operation based on at least one target video editing material, acquiring a shooting video material and presenting a target effect video, wherein the target effect video is a video obtained by performing video editing on the shooting video material with the at least one target video editing material;

displaying the shooting video material and the at least one target video editing material in corresponding editing tracks on a page of editing the target effect video, wherein the editing tracks comprise a video track configured to display the shooting video material, the editing tracks further comprise at least one effect track configured to display the at least one target video editing material, wherein the video track is configured to display the shooting video material for editing in a time region corresponding to a presentation time of the shooting video material in the target effect video, the at least one effect track is configured to display the at least one target video editing material for editing in a time region corresponding to a presentation time of the at least one target video editing material in the target effect video, each of at least one effect track corresponds a target video editing material among the at least one target video editing material, and a relative relationship between a length of the video track and a length of the at least one effect track on the page of editing the target effect video indicates a relative relationship between respective durations of the shooting video material and the at least one target video editing material being presented in the target effect video;

performing at least one editing operation, wherein the at least one editing operation comprises editing the shooting video material by utilizing the video track or editing the target video editing material among the at least one target video editing material by utilizing a corresponding effect track among the at least one effect track; and updating the target effect video based on the at least one editing operation performed via the video track or the corresponding effect track.

10. The device according to claim 9, the operations further comprising:

previewing and playing the target effect video on a preview page;

displaying the shooting video material and the at least one target video editing material in corresponding editing tracks on the page of editing the target effect video in response to a triggering operation of an importing editing control on the preview page.

11. The device according to claim 9, the operations further comprising:

applying a first video editing material to the target effect video in response to an adding operation for the first video editing material.

12. The device according to claim 9, the operations further comprising:

acquiring material identification corresponding to the at least one target video editing material in the target effect video;

displaying a video editing material corresponding to the material identification in the editing track corresponding to the at least one target video editing material on the page of editing the target effect video; and displaying the shooting video material in the target effect video on the editing track corresponding to the shooting video material on the page of editing the target effect video.

\* \* \* \* \*